(12) United States Patent
Zolotnitsky et al.

(10) Patent No.: US 6,369,130 B2
(45) Date of Patent: *Apr. 9, 2002

(54) THERMOPLASTIC FLUOROPOLYMER COMPOSITIONS CONTAINING HYDROGENATED PLASTICIZERS

(75) Inventors: Mikhail Zolotnitsky, Jamison, PA (US); Gary Stanitis, Sewell, NJ (US); Julio A. Abusleme, Saronno (IT)

(73) Assignee: Ausimont S.p.A., Milan (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/164,625

(22) Filed: Oct. 1, 1998

(30) Foreign Application Priority Data

Oct. 3, 1997 (IT) .......................... MI97A2253

(51) Int. Cl.[7] .................. C08L 27/12; C08L 27/18; C08L 23/08; C08L 33/08; C08K 13/06
(52) U.S. Cl. .................. 523/210; 524/81; 524/401; 524/544; 524/546; 524/570; 524/558; 524/562
(58) Field of Search .................. 524/546, 81, 401, 524/405, 413, 558, 442, 406, 416, 437, 404, 411, 436, 432, 431, 544, 570, 562; 523/210

(56) References Cited

U.S. PATENT DOCUMENTS

| | | | |
|---|---|---|---|
| 3,445,434 A | * 5/1969 | Stilmar | 260/80.71 |
| 4,195,014 A | * 3/1980 | Dorfman et al. | 260/45.75 |
| 4,505,982 A | 3/1985 | Hoheisel | |
| H579 H | * 2/1989 | Fidelle et al. | 524/288 |
| 4,826,899 A | * 5/1989 | Rees | 524/94 |
| 4,865,910 A | * 9/1989 | Inogachi et al. | 428/268 |
| 5,137,999 A | 8/1992 | Oxenrider et al. | |
| 5,284,611 A | * 2/1994 | Grootaert et al. | 264/135 |

FOREIGN PATENT DOCUMENTS

| | | |
|---|---|---|
| EP | 0 185 241 A2 | 6/1985 |
| EP | 0 185 242 A2 | 6/1986 |
| EP | 0 426 274 | 5/1991 |
| EP | 0 728 776 A1 | 8/1996 |
| EP | 0 866 079 | 9/1998 |
| IT | MI 97A 00654 | 3/1997 |
| JP | 55025413 * | 2/1980 .................. 524/546 |

* cited by examiner

Primary Examiner—David W. Wu
Assistant Examiner—Kelechi C. Egwim
(74) Attorney, Agent, or Firm—Arent, Fox, Kintner Plotkin & Kahn

(57) ABSTRACT

Thermoplastic fluoropolymer compositions, flexible, without whitening, comprising: I) ETFE or ECTFE fluoropolymers modified with hydrogenated monomers; II) one or more hydrogenated plasticizers; III) one or more inorganic fire retardants; IV) optionally other ingredients such as fillers, smoke retarders, intumescent agents, pigments, lubricants, organic fire retardants and thermal stabilizers.

5 Claims, No Drawings

THERMOPLASTIC FLUOROPOLYMER COMPOSITIONS CONTAINING HYDROGENATED PLASTICIZERS

The present invention relates to thermoplastic fluoropolymer compositions for the plenum wire insulation and cable jacketing applications, that show a high time to ignition, a low smoke and heat release when put in contact with a heat source as for example in the Cone Calorimeter (see the ASTM E1354 test).

More in particular the present invention relates to thermoplastic compositions of fluoropolymers of ethylene with tetrafluoroethylene (ETFE) and/or chlorotrifluoroethylene (ECTFE), modified with one or more hydrogenated monomers.

The copolymers of ethylene and a fluorinated monomer such as tetrafluoroethylene (TFE), chlorotrifluoroethylene (CTFE), or both, are known in the art. It is also known the possibility to modify them with fluorinated unsaturated monomers in an amount between 0.1 and 10% by moles. For example we mention the (per)fluoroalkylvinylethers in which the alkyl group has at least two carbon atoms, in particular the perfluoropropylvinylether (see U.S. Pat. No. 3,624,250). Other possible comonomers have the formula R'—CH=CH$_2$, where R' is a perfluoroalkyl or a perfluoroalkoxy-perfluoroalkyl (see EP 185,241, EP 185,242)

The above mentioned ETFE and ECTFE copolymers non modified with fluoroolefins have poor affinity with hydrogenated substances, these being polymers or high molecular weight compounds (for example plasticizers).

In EP 728,776 a special fluoroolefin able to copolymerize with fluorinated olefins giving for example a modified ETFE, is disclosed. This polymer shows good affinity with hydrogenated polymers, in particular with aromatic polyesters.

In general the syntheses of special fluoroolefins are complex and therefore they are used as comonomers in ethylene fluoropolymers only when high performances are required. For example good chemical resistance combined with excellent mechanical properties at high temperatures (150°–200° C.).

The preparation of fluoropolymers blended with one or more plasticizers to make the fluoropolymers flexible and usable in the cable industry has a particular industrial interest. These polymers must be characterized by the absence of the whitening phenomenon when the cable is bended.

The whitening effect must be avoided because it visually represents the plastic deformation of the material, and due to this it cannot recover the initial state. The electrical properties required for this material are fully satisfied by the ECTFE which unfortunately has a high elastic modulus at room temperature, in general higher than 1500 MPa and therefore it is not flexible.

In addition the ECTFE has a stress-strain curve at room temperature characterized by a necking at yield that makes it sensitive to the whitening effect on the bended cable. The elastic modulus of ECTFE can be lowered by adding plasticizers, but in any case the material suffers of the whitening effect.

The Applicant, in order to overcome this problem, as disclosed in EP 866,079, has proposed the use of ETFE or ECTFE type fluoropolymers modified with hydrogenated monomers blended with plasticizers, having high flexibility and that do not show the whitening phenomenon.

However for safety reasons these flexible cables must show a high time to ignition, a low smoke and heat release when put in contact with a heat source, as for example in the Cone Calorimeter (see the ASTM E1354 test).

Unfortunately the presence of plasticizers increases the smoke and heat release.

The Applicant has found that when using fire retardants in the polymers compounded with plasticizers, it is possible to obtain flexible compositions having the following combination of properties:

good mechanical properties, absence of the whitening effect, decrease of smoke and heat release when tested in a Cone Calorimeter according to the ASTM E1354 test.

An object of the present invention is a composition comprising:

I) ETFE or ECTFE fluoropolymers modified with hydrogenated monomers;

II) one or more hydrogenated plasticizers;

III) one or more inorganic fire retardants;

IV) optionally other ingredients such as fillers, smoke retarders, intumescent agents, pigments, lubricants, organic fire retardants and thermal stabilizers.

More in particular the component I) of the compositions of the invention is a copolymer formed of:

(a) from 10 to 70%, preferably from 35 to 55%, by moles of ethylene, (b) from 30 to 90%, preferably from 45 to 65%, by moles of a fluorinated monomer selected from tetrafluoroethylene, chlorotrifluoroethylene, or mixtures thereof, (c) from 0.1 to 30%, preferably from 1 to 15%, by moles of a hydrogenated monomer of formula:

$$CH_2=CH-(CH_2)_n-R_1 \qquad (I)$$

where $R_1$=—$OR_2$, —$(O)_tCO(O)_pR_2$ wherein t and p are integers equal to 0 or 1 and $R_2$ is a hydrogenated radical from 1 to 20 carbon atoms, $C_1$–$C_{20}$, linear and/or branched alkyl radical, or cycloalkylic radical, or $R_2$ is H. The $R_2$ radical can optionally contain: heteroatoms preferably O, N; halogens preferably Cl; one or more functional groups, preferably selected from OH, COOH, epoxide, ester and ether; and double bonds. The above mentioned n is an integer in the range 0–10.

Preferably $R_2$ is an alkyl radical from 1 to 10 carbon atoms optionally containing one or more hydroxy functional groups, n is an integer in the range 0–5.

The preferred comonomers (c) are for example selected from the following classes:

1) Acrylic monomers of formula:

$$CH_2=CH-CO-O-R_2$$

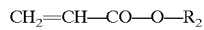

wherein $R_2$ has the aforesaid meaning.

For example ethylacrylate, n-butylacrylate, acrylic acid, hydroxyethylacrylate, hydroxypropylacrylate, (hydroxy)ethylhexylacrylate, etc., can be mentioned.

2) Vinylether monomers of formula:

$$CH_2=CH-O-R_2$$

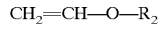

wherein $R_2$ has the aforesaid meaning.

For example propylvinylether, cyclohexylvinylether, vinyl-4-hydroxybutylether, etc., can be mentioned.

3) Vinyl monomers of the carboxylic acid of formula:

$$CH_2=CH-O-CO-R_2$$

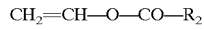

wherein $R_2$ has the aforesaid meaning.

For example vinyl-acetate, vinylpropionate, vinyl-2-ethylhexanoate, etc., can be mentioned.

4) Unsaturated carboxylic acid of formula:

$$CH_2=CH-(CH_2)_n-COOH$$

wherein n has the aforesaid meaning. For instance vinylacetic acid, etc.

The most preferred monomer of formula (I) is n-butyl acrylate.

Components II) are hydrogenated plasticizers well known in the art and used in the hydrogenated (co)polymers, from 1 to 20% by weight, preferably from 5 to 10% by weight referred to the total weight of the composition.

Examples of plasticizers, not limitative for the present invention, are: 2-ethylhexyldiphenylphosphate, neopentyl glycoldibenzoate, tricresylphosphate, tetrabromophtalate ester, tri-n-hexyl-trimellitate, ethylene glycol monostearate, acetyltri-n-hexyl citrate; preferably acetyltri-n-butyl citrate (Citroflex® A4), tributyl trimellitate and tri-n-hexyltrimellitate.

Components III) are the inorganic fire retardants used in amounts from 0.2 to 35% by weight, preferably from 1 to 15% by weight, referred to the total weight of the composition.

The fire retardants are well known in the art of hydrogenated (co)polymers. We can mention for example: inorganic phosphates (for example, ammonium phosphate), metal oxides (for example, aluminum oxide, aluminum oxide trihydrate, antimony oxides, molybdenum oxide), tin oxalates, boron compounds (for example, borax, zinc borate, Firebrake® ZB), metal hydroxide (for example, magnesium hydroxide, or hydroxide mixture such as $Zn(OH)_2$ and $Sn(OH)_4$ e.g. $ZnSn(OH)_6$).

Components IV) are used in amounts from 0.1 to 15% by weight, preferably from 0.5 to 5% by weight, referred to the total weight of the composition.

The optional ingredients are fillers (for example, polytetrafluoroethylene (PTFE), silicates, mica, metal oxide coated mica, mica blended with metal oxides), smoke retarders, lubricants, pigments, organic fire retardants (for example, halogenated compounds as chloroparaffins, brominated polyesters, brominated epoxy oligomers); intumescent agents and thermal stabilizers as, for example, Irganox® 1010.

Furthermore the Applicant has surprisingly found that the use of inorganic fire retardants treated with dispersing agents with respect to the simple addition of inorganic fire retardants to the plasticized ETFE or ECTFE fluoropolymer type modified with hydrogenated monomers, leads to a further unexpected increase of the time to ignition and to a further substantial decrease of smoke and heat release according to the ASTM E1354 test run in a Cone Calorimeter.

Therefore a further object of the present invention is the use of inorganic fire retardants treated with dispersing agents as hereinafter described.

The inorganic fire retardants are treated with dispersing agents in amounts ranging from 0.01 to 10% by weight, more preferably from 0.1 to 5% by weight.

Optionally, the inorganic components IV) of the composition can be treated with dispersing agents in an amount ranging from 0.01 to 10% by weight, more preferably from 0.1 to 5% by weight. For example fillers (e.g. mica) treated together with the fire retardants or singly with dispersing agents.

The dispersing agents according to the present invention are those known in the art to disperse fillers and that satisfy one of the following tests:

Test 1: any substance able to disperse inorganic fillers like silica, for example cristobalite, having at least 95% of the particles with average diameter of 2 μm, in solvents like methyl methacrylate. A dispersion is a system in which the particles of the filler are dispersed in the solvent or easily redispersable after segregation;

Test 2: any substance able to homogeneously disperse the inorganic fire retardants and/or the inorganic components IV) in another solid phase of known particle size distribution. The degree of dispersion, can be estimated by a visual analysis of a tablet of the dispersion using a coloured solid matrix.

The preferred dispersing agents according to the present invention have formula:

$$(R_3)_{4-m}A(X)_m \tag{II}$$

wherein m is an integer from 1 to 3, A is Si or Ti or Zr and X is a hydrolyzable group, $R_3$ is an oligomer of hydrogenated monomers or a $C_1$–$C_{15}$ alkyl and/or aryl radical. The $R_3$ radical can contain: unsaturations; one or more heteroatoms selected from: O, N, S, or halogens such as Cl; functional groups such as amine, epoxide, thio group —SH, hydroxide, carboxyl and carboxylate.

Among these, the preferred dispersing agents, in a monomeric or oligomeric form, are those wherein m is 2 or 3; X is a hydrolyzable group where X is preferably an alkoxy group $OR_4$ in which $R_4$ is a $C_1$–$C_5$ linear or branched alkyl radical, preferably $R_4$ is methyl or ethyl; $R_3$ and A are as above defined. Preferably A is Si and/or Ti. When A is equal to Si preferably m=3 and $R_4$ is methyl or ethyl.

For example we can mention: vinyltriethoxysilane, 3-aminopropyltriethoxysilane, 3-chloroisobutyltriethoxysilane, 3-mercaptopropyltriethoxysilane, octyltriethoxysilane, bisacetylacetonate diisopropoxytitanate.

As examples of oligomeric form of dispersing agents according to the formula (II) we can mention those of silane A-174. In the case $R_3$ is formed by hydrogenated monomers, we can mention, for example, the acrylic acid esters.

The addition of the dispersing agents to the inorganic fire retardants and to the inorganic component IV) is preferably carried out at room temperature and followed by a thermal treatment at about 100° C. for one or more hours. The water required for the hydrolysis of the dispersing agents comes from the reaction medium and/or from the solution containing one or more dispersing agents, or from the environment.

The following examples are given for illustrative purposes but are not limitative of the present invention.

In Table 1 the tests have been carried out according to the ASTM E1354 method for the time to ignition; heat and visible smoke release rates for materials and products using an Oxygen Consumption Calorimeter; Radiant Heat Flux 90 Kw/m²; sample weight 50 g; horizontal sample direction.

EXAMPLE 1

In an enamelled autoclave equipped with baffles and stirrer working at 450 rpm in Hastelloy C, 7 l of demineralized water, 15.5 g of chloroform, 10 g of n-butylacrylate and 2 kg of chlorotrifluoroethylene were introduced. The temperature reaction was set and maintained at 15° C. Then ethylene was charged up to a pressure of 8.2 absolute bars. In the autoclave the radical initiator was then continuously introduced during the whole polymerization time, under the form of a solution, maintained at −17° C., of trichloroacetylperoxide (TCAP) in isooctane with titre of 0.1 g TCAP/ml. In addition 10 g of n-butylacrylate were charged to the reactor at consumption of 20, 40, 60, 80, 100, 120, 140, 160 and 180 g of ethylene.

The pressure was maintained constant for the whole polymerization by continuously feeding ethylene in the reactor up to a consumption of 200 g; the total amount of initiator solution was of 210 ml. The polymerization lasted 405 minutes.

Then the polymer produced was dried at 120° C. for about 16 hours. The total dry weight was of 1530 g.

The polymer was then compounded with MARK-260® 0.45% by weight and Aclyn-316® 0.15% by weight both mainly used as thermal stabilizers.

Some characteristics of this polymer (defined Polymer A) are the following: the Melt Flow Index (M.I.) according to ASTM 3275–89 method is of 9 g/10'; the second melting point ($T_{mII}$) determined by Differential Scanning Calorimetry (DSC) is 190° C. and the molar composition obtained by carbon elemental analysis and by material balance is ethylene 40% by moles, chlorotrifluoroethylene 55% by moles and n-butylacrylate 5% by moles.

EXAMPLE 2 (COMPARATIVE)

The polymer powder A has been blended with Citroflex® A4 in an amount equal to 7% by weight based on the blend. Then the blend has been pelletized in a twin-screw extruder. This compound has been tested in a Cone Calorimeter according to the ASTM E1354 method. Table 1 reports time to ignition, peak heat release rate, total heat released and average extinction coefficient related to the smoke for a sample of 50 g by weight.

EXAMPLE 3

The polymer powder A blended with Citroflex® A4 as in Example 2 has been compounded with zinc borate (Firebrake® ZB 500) 5% by weight and mica 1% by weight based on the total weight. Then the blend has been pelletized in a twin-screw extruder. This compound has been tested in a Cone Calorimeter according to the ASTM E1354 method. Table 1 reports time to ignition, peak heat release rate, total heat released and average extinction coefficient related to the smoke for a sample of 50 g by weight.

EXAMPLE 4

As in Example 3 except that zinc borate and mica are blended with 2% by weight of water-borne-3-aminopropyl-triethoxysilane, and then thermally treatment at 100° C. for two hours. Then the blend has been pelletized in a twin-screw extruder. This compound has been tested in a Cone Calorimeter according to the ASTM E1354 method. Table 1 reports time to ignition, peak heat release rate, total heat released and average extinction coefficient related to the smoke for a sample of 50 g by weight.

EXAMPLE 5

As in Example 3 except that zinc borate and mica are blended with 2% by weight of a solution formed by 75% by weight of bisacetylacetonate diisopropoxytitanate and 25% by weight of isopropanol, and then thermally treated at 100° C. for two hours. Then the blend has been pelletized in a twin-screw extruder. This compound was tested in a Cone Calorimeter according to the ASTM E1354 method. Table 1 reports time to ignition, peak heat release rate, total heat released and average extinction coefficient related to the smoke for a sample of 50 g by weight.

The mechanical properties at 23° C. according to the ASTM D1708 test of compression moulded specimen of the compound are shown in Table 2.

EXAMPLE 6

As in Example 3, except that zinc borate and mica are blended with 2% by weight of a solution formed by 75% by weight of bisacetylacetonate diisopropoxytitanate and 25% by weight of isopropanol and with 2% by weight of water-borne 3-aminopropyltriethoxysilane, and then thermally treated at 100° C. for two hours. Furthermore, 1% by weight of PTFE (POLYMIST®) has been added to the compound and then pelletized in a twin-screw extruder.

This compound has been tested in a Cone Calorimeter according to the ASTM E1354 method. Table 1 reports time to ignition, peak heat release rate, total heat released and average extinction coefficient related to the smoke for a sample of 50 g by weight.

The mechanical properties at 23° C. according to the ASTM D1708 test of compression moulded specimen of the compound are shown in Table 2.

From Tables 1 and 2 it can be observed that the compositions of the invention are characterized by having good mechanical properties, they are flexible, they do not show the whitening effect and they have excellent flame-retardant and smoke-suppressed properties.

TABLE 1

Cone Calorimeter data according to the ASTM E1354 method. Radiant Heat Flux 90 Kw/m². Horizontal orientation of the sample.

| Examples | Time to ignition sec. | Peak heat release rate $Kw/m^2$ | Total heat released $MJ/m^2$ | Average extinction coefficient (smoke) $m^2/g$ |
|---|---|---|---|---|
| Example 2 (comp) Polymer A (P) | 16 | 203 | 25.3 | 0.631 |
| Example 3 Polymer A (P,FR) | 15 | 141.6 | 24.3 | 0.525 |
| Example 4 Polymer A (P,SiFR) | 210 | 41.3 | 12.4 | 0.139 |
| Example 5 Polymer A (P,TiFR) | 220 | 40.7 | 12.9 | 0.124 |
| Example 6 Polymer A (P,L,SiTiFR) | 196 | 32.6 | 12.8 | 0.114 |

P = blended with plasticizer Citroflex ® A4
L = blended with PTFE (POLYMIST ®)
FR = blended with mica and zinc borate
SiFR = blended with mica and zinc borate treated with silanate
TiFR = blended with mica and zinc borate treated with titanate
SiTiFR = blended with mica and zinc borate treated with silanate and titanate

TABLE 2

| Mechanical properties 23° C. | Example 5 Polymer A (P,TiFR) | Example 6 Polymer A (P,L,SiTiFR) |
|---|---|---|
| Elastic modulus (MPa) | 270 | 280 |
| Stress at yield (MPa) | 10 | 10 |
| Elongation at yield (%) | (*) | (*) |
| Stress | 27 | 28 |

TABLE 2-continued

| Mechanical properties 23° C. | Example 5 Polymer A (P,TiFR) | Example 6 Polymer A (P,L,SiTiFR) |
|---|---|---|
| at break (MPa) | | |
| Elongation at break (%) | 260 | 270 |

(*) It cannot be determined because of the absence of the necking at yield in the stress-strain curve
P = blended with plasticizer Citroflex ® A4
L = blended with PTFE (POLYMIST ®)
TiFR = blended with mica and zinc borate treated with titanate
SiTiFR = blended with mica and zinc borate treated with silanate and titanate

What is claimed is:

1. Thermoplastic fluoropolymer compositions, flexible without whitening, comprising:
   I) a copolymer consisting of:
      (a) from 10 to 70%, by moles of ethylene,
      (b) from 30 to 90%, by moles, of a fluorinated monomer selected from tetrafluoroethylene, chlorotrifluoroethylene and mixtures thereof,
      (c) from 0.1 to 30%, by moles, of a hydrogenated monomer of formula $$CH_2=CH-(CH_2)_n-R_1 \quad (I)$$

where $R_1=OR_2$, $-(O)_tCO(O)_pR_2$ wherein t and p are individually integers equal to 0 or 1, n is an integer in the range 0–5;
   $R_2$ is an alkyl radical having from 1 to 10 carbon atoms, optionally containing one or more hydroxyl functional groups;
   II) 1–20% by weight of a hydrogenated plasticizer;
   III) 0.2–35% by weight of an inorganic fire retardant selected from inorganic phosphates, metal oxides, tin oxalates, boron compounds and metal hydroxides which has been hydrothermally treated with 0.01 to 10% by weight of a dispersing agent having the formula

   $$(R_3)_{4-m}A(X)_n \quad (II)$$

in which
   $R_3$ is a $C_3$–$C_5$ alkyl, alkenyl or aryl radical optionally containing O, N, S, halogen or a group selected from amine, epoxide, thio-SH, hydroxide, carboxyl, carboxilate;
   m is 2 or 3;
   X is an alkoxy $-OR_4$, wherein $R_4$ is $C_1$–$C_5$ alkyl;
   A is Si or Ti, provided that when A is Si, m is 3 and $R_4$ is methyl or ethyl,
   the % by weight of components II) and III) are referred to the total weight or the composition of I), II) and III)).

2. Compositions according to claim 1, wherein the comonomer c) is selected from the group consisting of: ethylacrylate, n-butylacrylate, acrylic acid, hydroxyethylacrylate, hydroxypropylacrylate, (hydroxy)-ethylhexylacrylate, propylvinylether, cyclohexylvinylether, vinyl-4-hydroxybutylether, vinylacetate, vinylpropionate, vinyl-2-ethylhexanoate and vinylacetic acid.

3. Compositions according to claim 1, wherein the hydrogenated plasticizer II) is selected from the group consisting of 2-ethylhexyldiphenylphosphate, neopentyl glycoldibenzoate, tricresylphosphate, tetrabromophthalic ester, tri-n-hexil-trimellitate, ethylene glycol monostearate, acetyl tri-n-hexyl citrate, acetyl tri-n-butyl citrate and tribytyl trimellitate.

4. Compositions according to claim 1, wherein the component III) is selected from the group consisting of: ammonium phosphate, aluminum oxide, aluminum oxide trihydrate, antimonium oxides, molybdenum oxide, borax, zinc borate, magnesium hydroxide, $Zn(OH)_2$, $Sn(OH)_4$ and mixtures thereof.

5. Compositions according to claim 1, wherein the dispersing agent of formula (II) is selected from the group consisting of vinyltriethoxysilane, 2-aminopropyltriethoxysilane, 3-chloroisobutyltriethoxysilane, 3-mercaptopropyltriethoxysilane, octyltriethoxysilane and bis-acetylacetonate diisopropxytitanate.

* * * * *